Oct. 11, 1927.
H. NICHOLS
1,645,396
VEHICLE WHEEL
Filed Aug. 2, 1924
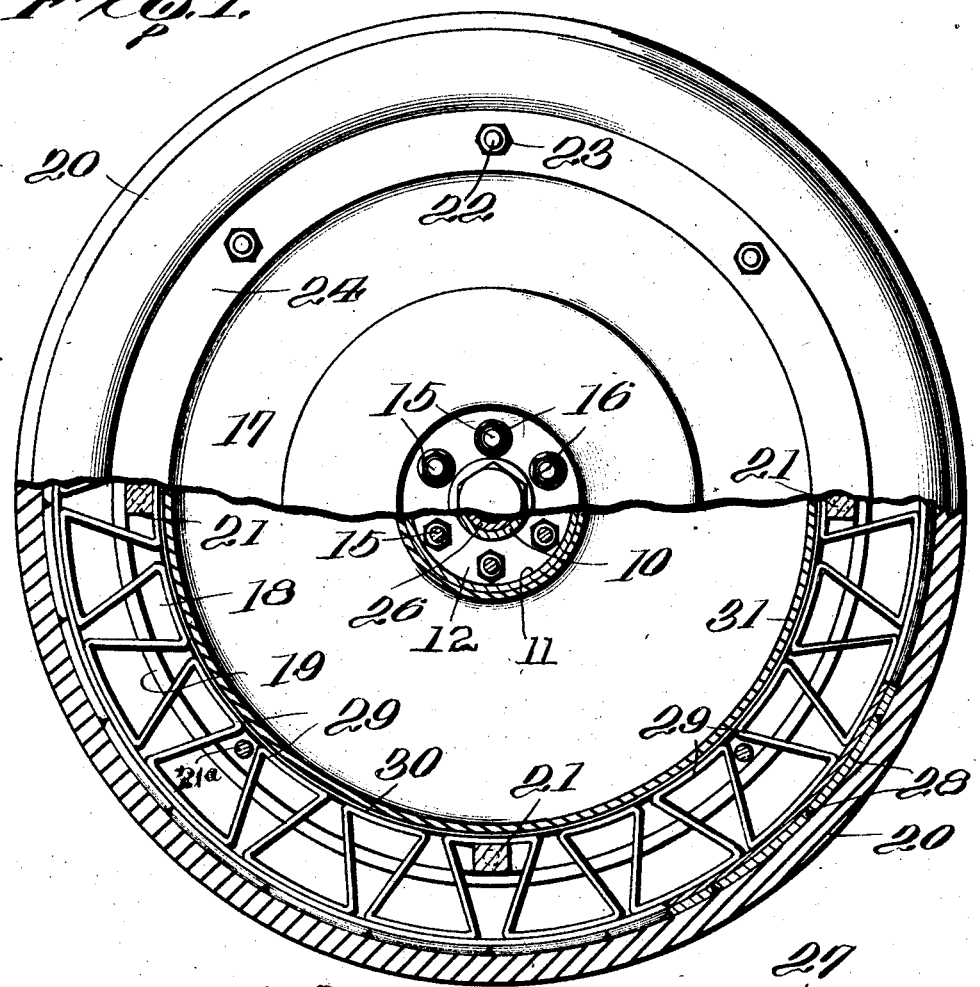
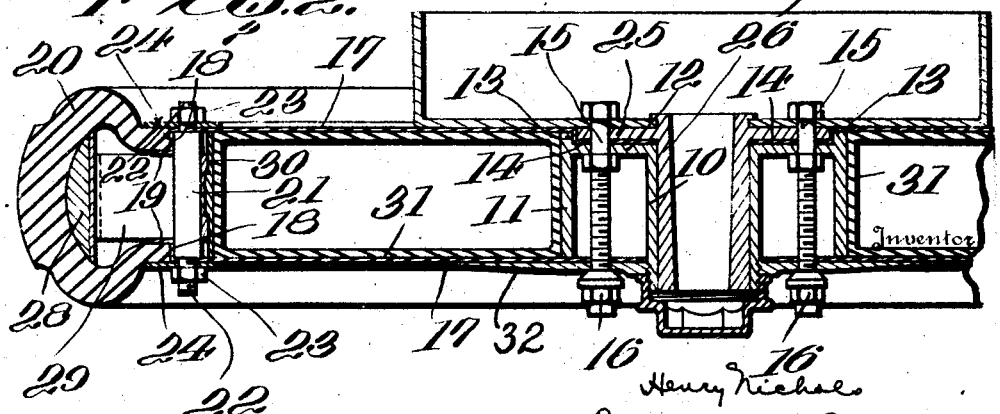

Patented Oct. 11, 1927.

1,645,396

UNITED STATES PATENT OFFICE.

HENRY NICHOLS, OF NEW YORK, N. Y.

VEHICLE WHEEL.

Application filed August 2, 1924. Serial No. 729,720.

This invention is a wheel for motor vehicles and the like, having means substituted for the standard pneumatic tire, to absorb road and other shocks imparted to the wheel while in operation.

One of the objects of the invention is to provide a wheel of simple construction, which will have all of the beneficial advantages of a wheel equipped with a standard pneumatic tire, and yet not be subjected to the inconveniences which usually result from punctures and blow-outs. A further object is to provide a wheel formed of separable sections having means whereby a shoe similar to that of a standard pneumatic tire, may be secured thereto, and means within the shoe for transmitting the road shocks around the same. A further object is to provide a pneumatic cushion of maximum capacity for the wheel, so positioned that it will not be exposed to wear or contact with the road bed, and means interposed between the same and the tire shoe to carry the road shocks around the wheel, whereby the weight of the load is stabilized and a perfect balancing of the cushioning functions is secured. A further object is to provide efficient means for retaining the sections of the wheel in assembled relation, and so constructed that the parts of the wheel may be readily disassembled if occasion should require. A further object is to provide internal equalizing means for the tire shoe, and simple retaining means therefor. A further object is to provide means for reenforcing the sides of the wheel against outwardly directed force exerted by the pneumatic cushion.

The invention will be hereinafter fully set forth and particularly pointed out in the claims.

In the accompanying drawing:—

Figure 1 is a side elevation with parts broken away, illustrating a wheel constructed in accordance with the invention. Figure 2 is a transverse sectional view.

Referring to the drawing, the hub member comprises a hub 10, and a relatively spaced concentric shell 11, said hub and shell being joined at one end by a wall 12, the contiguous end of the shell overhanging the wall to a certain extent, to provide a flange 13, which co-operates with the wall to form an external chamber 14.

Secured to the hub member by means of threaded bolts 15, provided with nuts 16 on their outer ends, are the side plates 17, which abut against the ends of the hub member and are maintained in spaced relation by the latter. Said side plates are provided with holes for the passage of the bolts 15, and are clamped in position by means of said bolts and the nuts 16. It will be noted that said side plates contiguous to their peripheries are bent inwardly, as indicated at 18, and then radially as indicated at 19, to form flanges co-operating with the portions 18, to provide seats for the beads of a standard type pneumatic tire shoe 20.

The inwardly bent portions 18 serve as seats for spacer members 21, which are preferably of bolt-like form rectangular in cross section, and provided with reduced threaded ends 22, to receive nuts 23 alternately with the spacer members 21 are bolts 21ª which are also provided with nuts 23. By reducing the ends of the spacer members shoulders are formed, against which the side plates 17 abut, the nuts 23 aiding in retaining said side plates in position. The spacer members maintain the proper spacing of said side plates near their peripheries. The tire shoe is retained in place by means of flat metal rings 24, which are provided with openings complemental to the threaded portions 22 of the spacer members, being retained in position by the nuts 23.

One of the plates 17 is provided with an offset portion complemental to the chamber 14, said offset portion forming the receiving chamber for a flange 25, formed on one end of a hub bushing 26, located within hub 10. A brake-drum 27 may also be engaged by said bushing, being retained by the bolts 15. If desired a portion of one end of the hub may be upset over the contiguous wall of the brake drum, as shown.

Located within the tire shoe 20 is a tread equalizing member 28, having pad-like portions shaped to conform to the internal contour of the shoe. Bearing against the inner surface of the equalizing member is a convolute equalizing member 29, the convolutions of which extend from the member 28 between the flanges 19, and bear against an elastic ring 30. Said ring 30 is interposed between the convolute equalizing member and a pneumatic cushion 31, extending around the hub member and located between the side plates. Said ring 30 is preferably constructed of wood fiber and protects the pneumatic cushion from puncture by the convolute member 29. It will be noted that the spacer members 21 pass through convolutions of the equalizing member 29, and serve as anchoring means for said convolute member. The convolutions of the convolute equalizing member are of approximately triangular shape in side view, so as to provide acute angled bends with maximum bearing surfaces against the equalizing rings 28 and 30.

In practice, the cushion 31 is inflated to the desired pressure, approximating the pressure of the standard pneumatic tire, through the medium of a suitable valve. When the wheel is without load the air pressure within said cushion acting against the spring 30 will force the convolute equalizing member 29 outwardly in a radial direction, and thereby maintain the tire shoe in a distended condition by reason of the pressure of said convolute equalizing member against the member 28. When the wheel is under load said member 28 tends to force the convolute equalizing member 29 inwardly, and this pressure is equalized at the shoe 20 by means of the member 28, in much the same manner as the standard pneumatic tire distributes the load. The acute angled bends of the convolute equalizing member 29 serve to make said member sensitive to the inward pressures and shocks, and to more equally and resiliently distribute the shocks around the wheel. At the same time, the tire shoe is maintained in its properly distended condition. Any inward pressure of the convolute equalizing member upon the spring 30, causes the latter to react against the pneumatic cushion to distribute the load around the same in a manner well-understood in the art. At the same time the convolutions tend to also carry the strains around the wheel. Thus the pressure upon the pad member 28 is carried through the convolute equalizing member 29, and the spring 30 to the cushion 31. And the member 28 and the convolutions of member 29 also react against each other to carry the strains and shocks around the wheel.

From the foregoing it will be readily understood that a very simple and inexpensive wheel is provided, so constructed that the parts may be readily separated, if desired, for repairs and the like. To separate the sections it is only necessary to remove the nuts 16, and the nuts 23 on outer side, whereupon the contiguous clamping plate 24 and the side plate 17 may be removed. In this manner the interior of the wheel is made readily accessible in the event that repairs or change of parts may be necessary.

By placing the pneumatic cushion 31 between the side plates 17 so that it will not be exposed to direct contact with extraneous substances, all of the advantages of the standard pneumatic tire are obtained and yet the inconveniences which normally result from exposure to punctures and blow-outs are avoided. The side plates 17 may be made of relatively thin metal. If reenforcement to withstand the outwardly exerted pressure of the pneumatic cushion is necessary, a plate 32 may be provided, secured in place by the bolts 15 and nuts 16 and the hub cap.

By shaping the edges of the plates to provide the shoulders 18 and flanges 19 annular seats are provided for the beads of a tire shoe and accurate positioning of the spacer blocks is insured.

Having thus explained the nature of the invention and described an operative manner of constructing and using the same, although without attempting to set forth all of the forms in which it may be made, or all of the forms of its use, what is claimed is:—

1. A wheel of the character described comprising a hub member, side plates secured thereto, a pneumatic cushion enclosed between said side plates and encircling the hub member, spacer members interposed between said plates contiguous to the peripheries thereof, a tire shoe engaging the peripheries of said plates, a convolute equalizing member interposed between said tire shoe and said cushion and reacting against both, and shoe retaining means co-operating with said spacer members.

2. A wheel of the character described comprising a hub member, side plates secured thereto, a pneumatic cushion enclosed between said side plates and encircling the hub portion, a tire shoe engaging the peripheries of said plates, a convolute equalizing member interposed between said tire shoe and said cushion and reacting against both, spacer members passed between contiguous convolutions of said equalizing member and engaging portions thereof, whereby the equalizing member is retained in position, and shoe retaining means co-operating with said spacer members.

3. A wheel of the character described comprising a hub member, side plates secured thereto, a pneumatic cushion enclosed between said side plates and encircling the hub portion, spacer members interposed between said plates contiguous to the peripheries thereof and having reduced threaded ends passed through the plates, whereby abutment shoulders for said plates are provided, a tire shoe engaging the periphery of said plates, a convolute equalizing member interposed between the tire shoe and said cushion reacting against both, and shoe retaining means engaging the threaded ends of said spacer members.

4. A wheel of the character described comprising a hub member, side plates secured thereto and having inwardly offset portions forming seats, spacer members engaging said seats and maintaining said plates in spaced relation, a tire shoe engaging the peripheries of said plates, a pneumatic cushion enclosed between said plates, equalizing means interposed between said tire shoe and said cushion and reacting against both, and means retaining the tire shoe in place.

5. A wheel of the character described comprising a hub member, side plates secured thereto having inwardly offset portions forming seats and radially extended flanges, a tire shoe having flanges engaging the peripheries of said plates at the intersection of said seats and flanges, spacer members engaging said seats and maintaining said side plates in spaced relation, a pneumatic cushion enclosed between said plates, equalizing means interposed between said tire shoe and said cushion and reacting against both, and tire-shoe-retaining means co-operating with said spacer members.

6. A wheel of the character described comprising a hub member, side plates secured thereto having inwardly offset portions forming seats and radially extended flanges, a tire shoe having flanges engaging the peripheries of said plates at the intersection of said seats and flanges, spacer members engaging said seats and maintaining said side plates in spaced relation, a pneumatic cushion enclosed between said plates, equalizing means interposed between said tire shoe and said cushion and reacting against both, tire-shoe-retaining rings engaging said spacer members, and means co-operating with said members to retain said rings in place.

7. A wheel of the character described comprising a hub member provided with a sleeve-like body portion and a relatively spaced concentric shell joined thereto by a single end wall, side plates abutting against the ends of said shell and removably held in place, a pneumatic cushion held between the side plates, said cushion encircling and contacting with said shell, a tire shoe, means for retaining said tire shoe in place, and an equalizing member interposed between and contacting with said tire shoe and said cushion.

8. A wheel of the character described comprising a hub member provided with a sleeve-like body portion and a relatively spaced concentric shell joined by a single end wall, side plates abutting against the ends of said shell, bolts for retaining said side plates in position, said bolts being passed through said end wall and the open space between the body portion and the shell of said hub member, a pneumatic cushion interposed between the side plates, said cushion encircling and contacting with said shell, a tire shoe, means for retaining said tire shoe in place, and an equalizing member interposed between and contacting with said tire shoe and said cushion.

9. A wheel of the character described comprising a hub member provided with a central hub portion and a relatively spaced concentric shell joined at one end by a vertical wall, an annular flange overhanging said wall and co-operating therewith to form an external chamber, side plates abutting against the ends of said hub shell, one of said side plates having an offset portion extended into said chamber, a tire shoe, and means for normally maintaining said shoe in distended condition.

10. A wheel of the character described comprising a hub member provided with a central hub portion and a relatively spaced concentric shell joined at one end by a wall, an annular flange overhanging said wall and co-operating therewith to form an external chamber, side plates abutting against said hub shell, one of said side plates having an offset portion extended into said chamber, whereby a bushing-flange-receiving chamber is provided, a hub bushing located within the hub and having a flange located within the bushing-flange-receiving chamber, bolts extended through said bushing flange and the side plates, nuts engaging said bolts, a tire shoe, and means maintaining said tire shoe in normally distended condition.

11. A wheel of the character described comprising a hub member provided with a central hub portion and a relatively spaced concentric shell joined at one end by a wall, an annular flange overhanging said wall and co-operating therewith to form an external chamber, side plates abutting against said hub shell, one of said side plates having an offset portion extended into said chamber, whereby a bushing-flange-receiving chamber is provided, a hub bushing located within the hub and having a flange located within the bushing-flange-receiving chamber, bolts extended through said bushing flange and the side plates, nuts engaging said bolts, a tire shoe, means maintaining said tire shoe in normally distended condition, and a brake-drum engaged by said hub bushing and retained in position by said bolts.

In testimony whereof I have hereunto set my hand.

HENRY NICHOLS.